United States Patent Office 3,342,894
Patented Sept. 19, 1967

3,342,894
PRODUCTION OF COMPOSITE GLYCIDYL POLYETHERS
Herbert P. Price, Louisville, Ky., assignor to Celanese Coatings Company, New York, N.Y., a corporation of Delaware
No Drawing. Filed Apr. 11, 1966, Ser. No. 541,496
7 Claims. (Cl. 260—830)

ABSTRACT OF THE DISCLOSURE

A process for preparing homogeneous mixtures of glycidyl polyethers of polyhydric phenols by subjecting a polyhydroxy-polyether terminated with phenolic hydroxyl groups and a simple phenolic compound to condensation and dehydrohalogenation in an excess of epihalohydrin using caustic alkali as the condensing and dehydrohalogenating agent.

---

This application is a continuation-in-part of my co-pending application Serial No. 200,300, filed June 6, 1962, now abandoned.

This invention relates to the production of glycidyl polyether compositions. More particularly, the invention relates to improvements in the preparation of composite glycidyl polyethers. Glycidyl polyethers have heretofore generally been polyglycidyl ethers of such bisphenolic compounds as bis(4-hydroxyphenyl) dimethylmethane. Although liquid resins made from bisphenolic compounds are widely used, the so-called hard resins, that is, solid glycidyl polyethers of dihydric phenols, are subject to several disadvantages. One method of overcoming these disadvantages has been to mix these hard resins with a low molecular weight glycidyl polyether. While the process of mixing solid glycidyl polyethers with liquid glycidyl polyethers results in products overcoming the disadvantages of hard resins, processes for making such composite glycidyl polyethers have not been entirely satisfactory, particularly where the glycidyl polyethers are made from different phenols. Incompatibility and solubility traits of the various resins are often encountered. In addition, difficulties frequently occur during washing by the usual methods of forming composite glycidyl polyether compositions.

In accordance with the process of this invention, glycidyl polyether compositions having a wide variety of properties can be made without encountering compatibility and solubility problems. Since compatibility is of no concern, virtually any composite mixture can be made by the process of this invention.

These composite mixtures are homogeneous mixtures of glycidyl polyethers of different phenolic compounds containing substantially no inter-reacted products.

By the practice of this invention, a complex polymeric dihydric phenol polyether alcohol is combined with another phenol. The mixture of the other phenol and the complex dihydric phenol polyether alcohol is then reacted with an excess of epihalohydrin to form a composite polyhalohydrin ether using the well known phenol-epihalohydrin reaction. The composite polyhalohydrin ether is dehydrohalogenated to form the desired composite glycidyl polyether. The composite glycidyl polyethers are thus made through the phenol rather than through the finished resin. Accordingly, properties can be obtained in the production of composite glycidyl polyethers contemplated herein by merely varying the phenol. According to this invention, therefore, composite glycidyl polyethers are prepared from complex dihydric phenol polyether alcohol mixtures. The complex dihydric phenol polyether alcohols are best represented by the following formula:

(M) HOR$_1$(OCH$_2$CHOHCH$_2$OR$_1$)$_a$
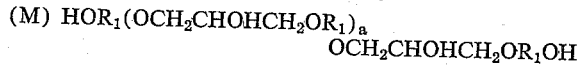
OCH$_2$CHOHCH$_2$OR$_1$OH wherein R$_1$ is a divalent aromatic hydrocarbon radical (which was linked directly to two hydroxyl groups of starting dihydric phenol), and wherein $a$ is an integer 0 through 10, representing the average molecular weight. Such complex phenol polyether alcohols are made by reacting an epihalohydrin with an excess amount of a dihydric phenol in the presence of caustic. The excess of dihydric phenol is generally such that the ratio ranges from 1.09 to 2 mols dihydric phenol per mol of epihalohydrin.

Complex dihydric phenol polyether alcohols contemplated herein are made from dihydric phenols which are converted into polymeric dihydric phenol ethers with one or more intermediate aliphatic alcoholic hydroxyl-containing groups or nuclei. The aliphatic groups or nucleus may contain one or more alcoholic hydroxyls in each group or nucleus. The complex dihydric phenol polyether alcohols can thus be made, for instance, from two mols of dihydric phenol and one mol of epichlorohydrin. The complex dihydric phenol polyether alcohols can also be produced by the reaction of two mols of dihydric phenol with one mol of any of the known diepoxides, or three mols of a dihydric phenol with two mols of a diepoxide, in which case the intermediate nuclei will contain at least two aliphatic hydroxyls in each nucleus. More complex and higher polymeric dihydric phenol polyether alcohols can be made from the reaction of a dihydric phenol with other amounts of diepoxide to give polymeric reaction products, those having different values of $a$, (Formula M), containing terminal phenolic hydroxyl groups.

The second step of this process involves subsequently reacting complex polymeric dihydric phenol polyether alcohol M in combination with a different polyhydric phenol with an excess of epihalohydrin over that which can combine with the phenolic compounds. If an excess of phenol is employed in the preparation of the complex polymeric dihydric phenol polyether alcohols, this excess can be retained and reacted with epihalohydrin along with the epihalohydrin-complex dihydric phenol reaction. Thus, in the second stage of this process, two epihalohydrin-phenol reactions occur. The epihalohydrin reacts with the complex polymeric dihydric phenol polyether alcohol and with the other phenolic compound. The other phenolic compound can be the same phenol from which the complex polymeric dihydric phenol polyether alcohol was made or a different phenol used in order to obtain a desired property. In addition, desirable products are obtained by adding phenolic compounds having many hydroxyl groups such as the novolaks. Thus, phenols which can be added to the complex polymeric dihydric phenol polyether alcohol are mononuclear polyhydric phenolic compounds such as the resorcinols, hydroquinone, catechol, orcinol, pyrogallol and phloroglucinol. Also included are polynuclear phenols, for instance, bis(4-hydroxyphenyl)dimethylmethane, dihydroxy diphenyl ethylmethylmethane, dihydroxy diphenyl diethylmethane, dihydroxy diphenyl methylpropylmethane and novolaks, that is, phenol-aldehyde condensates, preferably those having molecular weights of about 210 to slightly over 1000, made by reacting an excess of phenol with an aldehyde (preferably formaldehyde) and containing no unreacted methylol groups. The invention thus contemplates phenolic compounds having the formula $R_2(OH)_x$, where $R_2$ is an aryl radical and wherein $x$ is a whole number from 2 to 10 inclusive. By aryl radical is meant the aromatic hydrocarbon nucleus of mono- or poly nuclear phenols.

As described, the phenolic compound used in the second stage of this process can be a newly added phenol or the simple phenol remaining from the phenol-epihalohydrin reaction of the first stage of the process. The amount of phenol used in this second stage is determined by the properties desired in the resulting composite glycidyl polyethers, particularly in the cured compositions. While these properties vary with particular phenols, optimum properties result by the use of the complex polymeric dihydric phenol and the second phenolic compound in a molar ratio of 1:10 to 10:1. Reaction of this mixture of phenols with an epihalohydrin forms composite halohydrin ethers. The composite halohydrin ethers thus formed are then dehydrohalogenated and washed free from salt by one of the known methods to form the desired composite glycidyl polyethers.

The amount of epihalohydrin employed at this stage normally would be about one mol of epihalohydrin for each phenolic hydroxyl group present. However, in most instances, this is not sufficient epihalohydrin to solubilize the phenols. An excess is required. Hence, the amount of epihalohydrin used in this stage desirably is expressed in terms of $a$ and $x$. Thus, the amount of epihalohydrin employed in this stage, expressed in mols, is $z[m(a+2)+nx]$, where $z$ is a number from 2 to 15, $m$ is the number of mols of complex phenol, $n$ is the number of mols of other phenol, and where $a$ and $x$ are defined hereinbefore.

More specifically, in carrying out one aspect of the process of this invention, bis(4-hydroxyphenyl) dimethyl methane (Bisphenol A), and epichlorohydrin are reacted in a ratio of 4 mols of Bisphenol A to 3 mols of epichlorohydrin, or 5 mols of Bisphenol A to 4 mols of epichlorohydrin. Caustic is employed as a condensing and dehydrohalogenating agent equivalent to or up to twenty percent excess over the chlorine content of the epichlorohydrin, and usually water is used as at least part of the reaction medium. The resulting complex dihydric phenol is cooled and dissolved in epichlorohydrin. The simple phenol is then dissolved in epichlorohydrin-complex phenol solution and an amount of caustic equivalent to the number of phenolic hydroxyl groups present is added, preferably in increments throughout the reaction. The composite glycidyl polyether composition produced is cooled, washed free of salt or filtered to remove the salt, and vacuum distilled to remove excess epichlorohydrin and/or solvent.

While the overall process as just described is novel, the specific steps sequentially involved in the process are known in the art. Thus, the reaction using more than one mol of a dihydric phenol with a mol of epihalohydrin to form the complex polymeric dihydric phenol polyether alcohol is a known reaction as shown in U.S. 2,668,805. Caustic alkali is used as a condensing agent at an elevated temperature usually between 90° C. and 120° C., the molar quantity of caustic alkali being at least equal to the epihalohydrin. Also known is the reaction of a phenol with an epoxide such as a glycidyl polyether or an aliphatic diepoxide.

The condensation and dehydrohalogenation reactions involved in this invention can be carried out concomitantly as is well known. These reactions are conducted at temperatures as low as 50° C. and as high as 150° C., using an excess of epihalohydrin. The reaction of epihalohydrin with the phenol is exothermic; therefore, the initial temperature is usually fairly low to control the exotherm. After the exotherm subsides, the epihalohydrin-dihydric phenol mixture is then heated to the desired temperature to complete the reaction of epoxide groups with the phenolic hydroxyl groups and to effect the dehydrohalogenation. For the dehydrohalogenation of halohydrin ether groups, sufficient alkaline material is employed to react with all of the chlorine or other halogen atoms of the condensate. The concomitant condensation and dehydrohalogenation reactions can be carried out without difficulty following such patent as U.S. 2,467,171. After the concomitant condensation-dehydrohalogenation reactions, the excess epihalohydrin can be stripped off and the product purified. The resin is usually dissolved in a ketone such as methyl isobutyl ketone and the salts are filtered out. After filtration, the ketone may be removed by distillation if desired. I have found that rather than first stripping off the excess epihalohydrin, this epihalohydrin can be used as a solvent instead of a ketone, purification being accomplished in substantially the same way, followed by the removal of the unreacted epihalohydrin.

While it is preferred to make a complex dihydric phenol and then convert the phenol to the epoxide derivation by concomitant condensation-dehydrohalogenation, it is understood that all three of these reactions can be carried out separately and at different times. The complex dihydric phenol, of course, is stable. Hence, its preparation is not necessarily an integral part of the process. When the condensation reaction is carried out as a separate step, a low temperature, say below 60° C., is employed along with such alkaline materials as sodium and potassium carbonates and bicarbonates, tertiary amines, quaternary ammonium salts, and hydroxides of magnesium, lithium, zinc, lead, iron, and aluminum and their corresponding oxides. Subsequent dehydrohalogenation is accomplished in this embodiment by heating the halohydrin ether to about 50° C. to 115° C., using an alkali metal hydroxide as set forth in U.S. 2,712,000.

Besides the fact that the specific dihydric phenol-epihalohydrin and dehydrohalogenation reactions are known in the art, it is obvious that any of the various dihydric phenols can be used in the formation of the complex polymeric dihydric phenol. For instance, all of the dihydric phenols mentioned hereinbefore can be used. In addition, the epihalohydrins can be further exemplified by 3-chloro-1,2-epoxy-butane, 3-bromo-1,2-epoxy-hexane, 3-chloro-1,2-epoxy-octane and the like.

The process of this invention can perhaps be best described by reference to the following specific examples.

*Example 1*

One mol (228 grams) of Bisphenol A is reacted with one-half mol (46.5 grams) of epichlorohydrin in one liter of water using 22 grams of flake sodium hydroxide as the condensing agent. The reaction is heated to reflux, about 101° C., for one and one-half hours. After the reflux period, the product is cooled, the water partially decanted, and 750 grams of epichlorohydrin added for use in the second stage. The contents are then heated to 105° C. to distill off remaining water. The water distilled off is separated from epichlorohydrin and all of the epichlorohydrin is returned to the vessel. In the second stage, after removal of water, the contents are cooled slightly to 90° C. and 45.6 grams (0.2 mol) of Bisphenol A are added. The vessel is further cooled to 75° C. and 22 grams of flake sodium hydroxide are added. The reactants are heated to reflux, cooled, and an additional 20 grams of flake sodium hydroxide are added. The material is again heated to reflux, cooled, and 20 grams of flake sodium hydroxide are added. Excess epichlorohydrin is then removed to a pot temperature of 150° C., 500 ml. methyl isobutyl ketone are added, and the salt is filtered out. The ketone is then distilled off under water aspirator to 160°

C. The product has a melting point of 42° C. and weighs 376 grams representing a 99 percent yield. This product has an epoxide equivalent of 298 compared with the theoretical equivalent of 271.

Example 2

Two mols (220 grams) of resorcinol, one and one-half mols (139 grams) of epichlorohydrin, and 62 grams of sodium hydroxide in one liter of water are reacted following the procedure for Example 1. In the second stage, the reagents added are ten mols (925 grams) of epichlorohydrin, one-half mol (114 grams) of Bisphenol A, and 82 grams of sodium hydroxide. The sodium hydroxide is added in four 21-gram portions. The product, 454 grams yield, has an epoxide equivalent of 289 compared to the theoretical value of 263.

Example 3

Bisphenol A and epichlorohydrin, in a mol ratio of 2 to 1, are are reacted according to the procedure of Example 1. One mol, 228 grams, of Bisphenol A, one-half mol, 46.5 grams, of epichlorohydrin, 22 grams of sodium hydroxide, and 0.8 liter of water are refluxed for one and one-half hours. After cooling slightly, the water is poured off and 10 mols (925 grams) of epichlorohydrin are added to the reaction flask. The remaining water is removed by distillation with epichlorohydrin, the epichlorohydrin being returned to the reaction as in Example 1. One-half mol (114 grams) of Bisphenol A is added followed by 82 grams of sodium hydroxide in one 28 gram and two 27 gram additions. After the excess epichlorohydrin is distilled off, methyl isobutyl ketone is added to dissolve the polyepoxide and the salt is filtered out. The ketone is distilled off leaving 468 grams, a 95 percent yield, of the product melting at 39° C. and having an epoxide equivalent of 274 compared with the theoretical equivalent of 242.

Example 4

As in the previous examples, one mol of Bisphenol A, one-half mol of epichlorohydrin and 22 grams of sodium hydroxide in one liter of water are reacted at reflux for one and one-half hours. After the reaction mixture is cooled and the water is poured off, ten mols (925 grams) of epichlorohydrin are added. The reactants are heated to 115° C. to dissolve the resinous polyphenol in the epichlorohydrin and to distill the residual water as an azeotrope with the epichlorohydrin. The epichlorohydrin is separated from the water and returned to the reaction flask. After one-half mol (55 grams) of resorcinol is dissolved in the epichlorohydrin-polyphenol mixture, 84 grams of sodium hydroxide are added in four equal portions at 80° C. to 85° C., allowing the temperature to rise to reflux, 96° C. to 100° C., after each addition. Then the water of reaction is distilled off to a pot temperature of 120° C. After cooling the reaction mixture and filtering out the salt, the resin is vacuum distilled to remove excess epichlorohydrin. The product, which weighs 407 grams, representing a 96 percent yield, has an epoxide equivalent of 244 compared with the theoretical equivalent of 211.

Example 5

Following Example 4, one and one-half mols of Bisphenol A are reacted with one mol of epichlorohydrin using 42 grams of sodium hydroxide. Ten mols of epichlorohydrin are added and the water is azeotropically removed from the system. One-half mol of Bisphenol A is then dissolved in the epichlorohydrin-polyphenol mixture. Eighty-four grams of sodium hydroxide are added in four portions. The product, weighing 602 grams, which represents a 96.6 percent yield, melts at 54° C. and has an epoxide equivalent of 353 compared with the theoretical value of 313.

Example 6

The procedure for this example is exactly the same as that described in Example 4. In this case, one-third mol (42 grams) of phloroglucinol is used instead of one-half mol of resorcinol. Otherwise, the reagents and the amounts used are the same. A yield of 312 grams is obtained. The product has an epoxide equivalent of 259, the theoretical being 204.

The foregoing examples show that the added phenol can be the same phenol as that used in the first stage or a different phenol. Polyepoxides having a wide variety of properties can be made by varying these phenols. Other modifications and processes of this invention will occur to one skilled in the art. Such modifications are within the scope of this invention.

The embodiments of this invention in which an exclusive property or privilege is claimed are defined as follows:

1. A process for producing homogeneous mixtures of glycidyl polyethers each molecular chain of which predominantly contains glycidyl end groups, which comprises mixing (1) a complex phenol polyether alcohol having the formula:

$$HOR_1(OCH_2CHOHCH_2OR_1)_aOCH_2CHOHCH_2OR_1OH$$

wherein $R_1$ represents a dihydric phenol residue and $a$ is an integer from 0 through 10, with (2) a phenolic compound having the formula $R_{(2)}(OH)_x$, wherein $R_{(2)}$ is an aryl radical free of substituents, other than the phenolic hydroxyls, which are reactive under the conditions of the reaction, and $x$ is a whole number from 2 to 10 inclusive, the molar ratio of said phenolic compound to said complex polyether alcohol being in the range from about 1:10 to about 10:1; reacting at a temperature of about 50° C. to about 150° C. the mixture of said phenolic compound and said complex polyether alcohol with an excess of epihalohydrin and a caustic alkali dehydrohalogenating agent, the molar quantity of epihalohydrin being equal to:

$$z[m(a+2)+nx]$$

wherein $m$ is the number of mols of said complex phenol polyether alcohol, $n$ is the number of mols of said phenolic compound, $z$ is a number from 2 to 15, and $x$ and $a$ are as defined above, the molar quantity of said caustic alkali being sufficient to insure the complete dehydrohalogenation of the reaction product of the epihalohydrin and said mixture of alcohol and phenolic compound in order to form composite polymeric glycidyl polyethers, said quantity of said alkali being equal to the total number of phenolic hydroxyl groups present which is $(nx+2m)$, wherein $n$, $x$ and $m$ are as defined above.

2. The process according to claim 1 wherein the molar ratio of the phenolic compound to the complex polyether alcohol is 0.4:1 and where the quantity of epihalohydrin subsequently reacted with said phenolic compound and said alcohol is equal to: $3[m(a+2)+nx]$.

3. The process according to claim 1 wherein $R_1$ is the nucleus of bis(4-hydroxyphenyl) dimethylmethane, the epihalohydrin is epichlorohydrin and the phenolic compound is a mononuclear polyhydric phenolic compound.

4. The process according to claim 1 wherein $R_1$ is the nucleus of bis(4-hydroxyphenyl) dimethylmethane, the epihalohydrin is epichlorohydrin and the phenolic compound is a polynuclear phenolic compound.

5. The process according to claim 4 wherein the polynuclear phenolic compound is a thermoplastic formaldehyde-phenol reaction product of an excess of phenol with formaldehyde, said product being free of reactive methylol groups and having a molecular weight from about 210 to about 1000.

6. The process according to claim 1 wherein the complex phenol polyether alcohol has the formula:

$$HOR_1(OCH_2CHOHCH_2OR_1)_2OCH_2CHOHCH_2OR_1OH$$

wherein $R_1$ is the nucleus of bis(4-hydroxyphenyl) dimethylmethane, wherein the phenolic compound is resorcinol, wherein the epihalohydrin is epichlorohydrin, and wherein the mol ratio of said resorcinol to said complex phenol polyether alcohol to said epihalohydrin prior to reaction with epihalohydrin is 1:1:15.

7. A homogeneous mixture of glycidyl polyethers of different phenolic compounds containing substantially no inter-reacted products obtained by the process of claim 1.

References Cited

UNITED STATES PATENTS 2,694,694  11/1954  Greenlee _____ 260—47

WILLIAM H. SHORT, *Primary Examiner.*

T. D. KERWIN, *Assistant Examiner.*